United States Patent Office 2,769,297
Patented Nov. 6, 1956

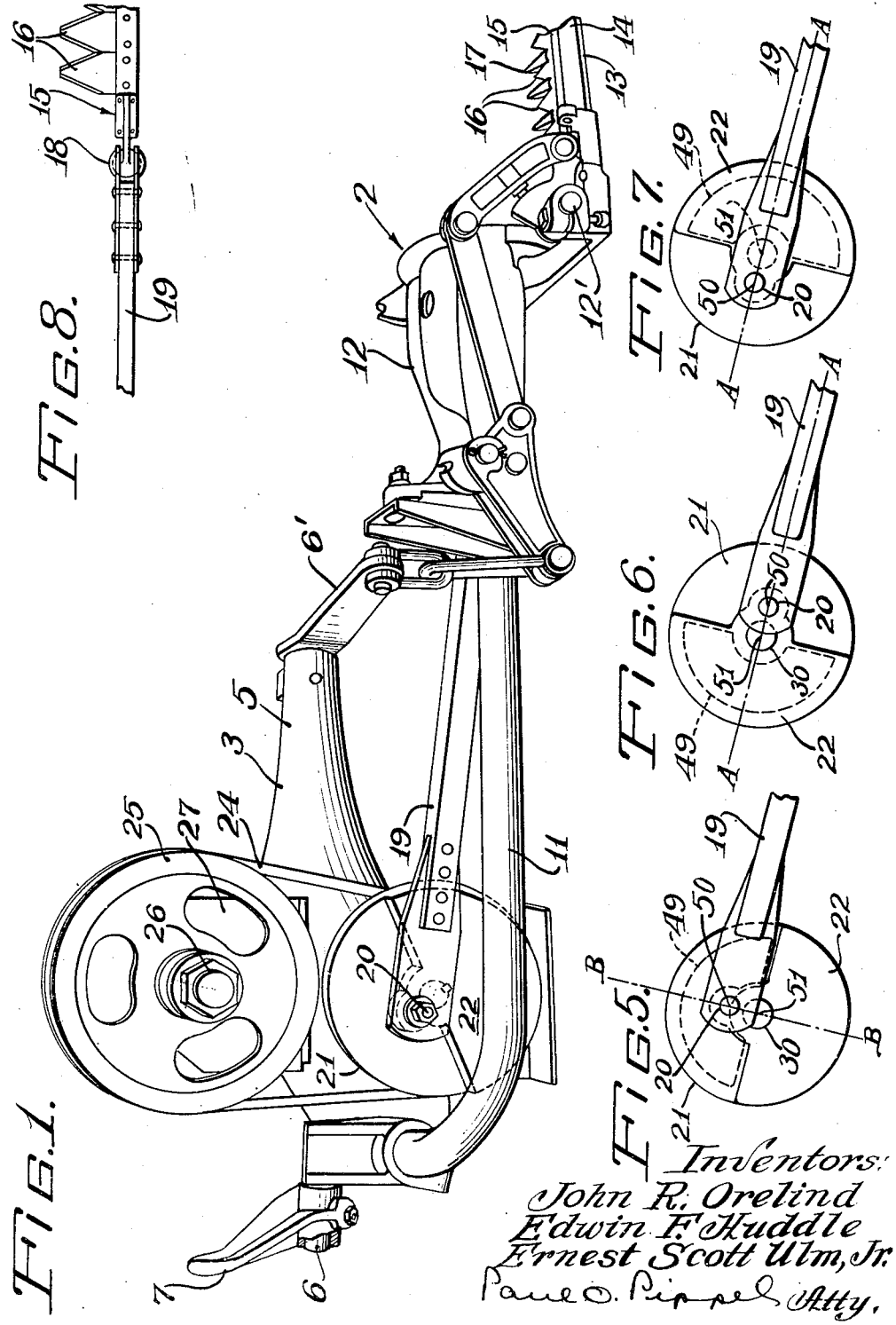

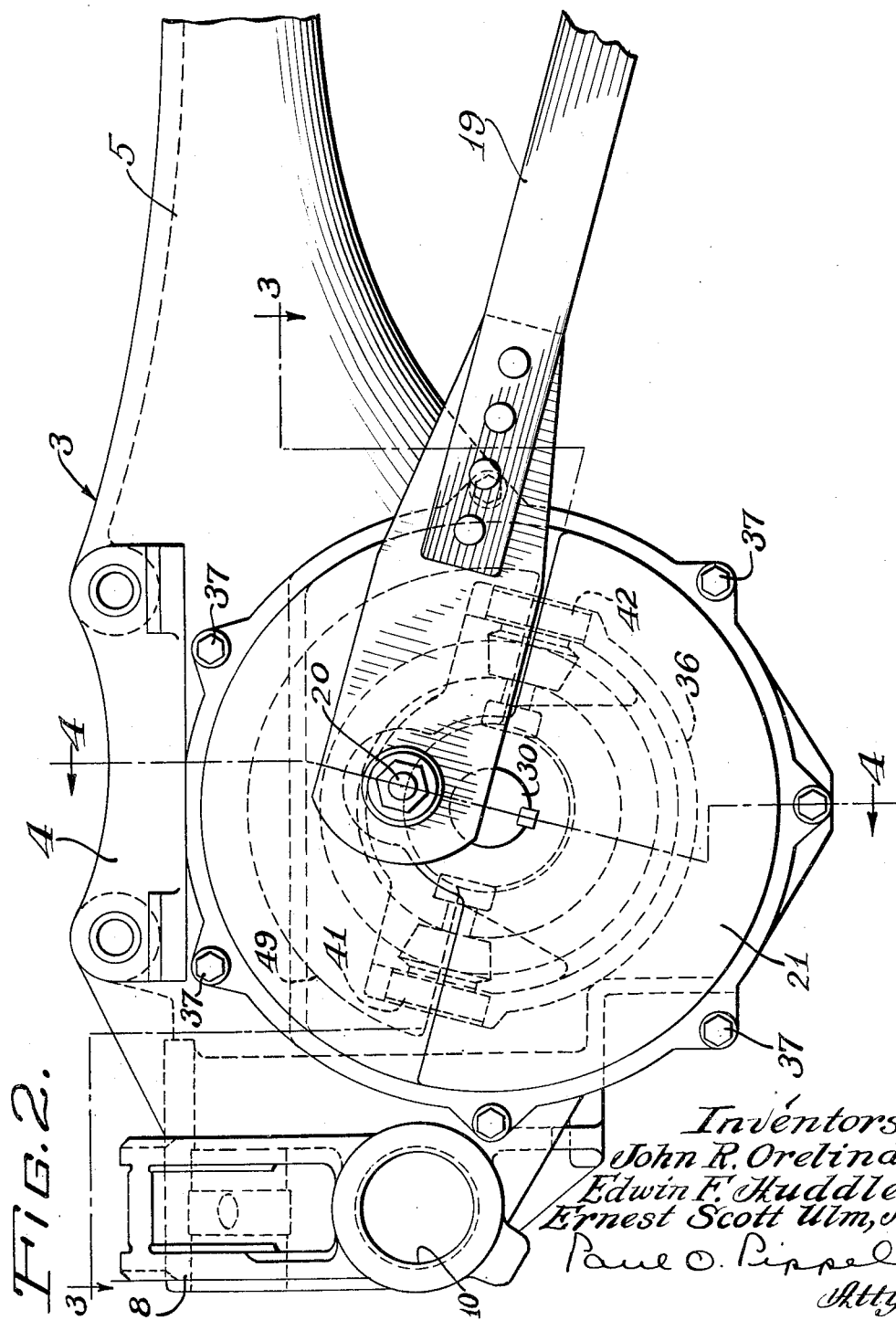

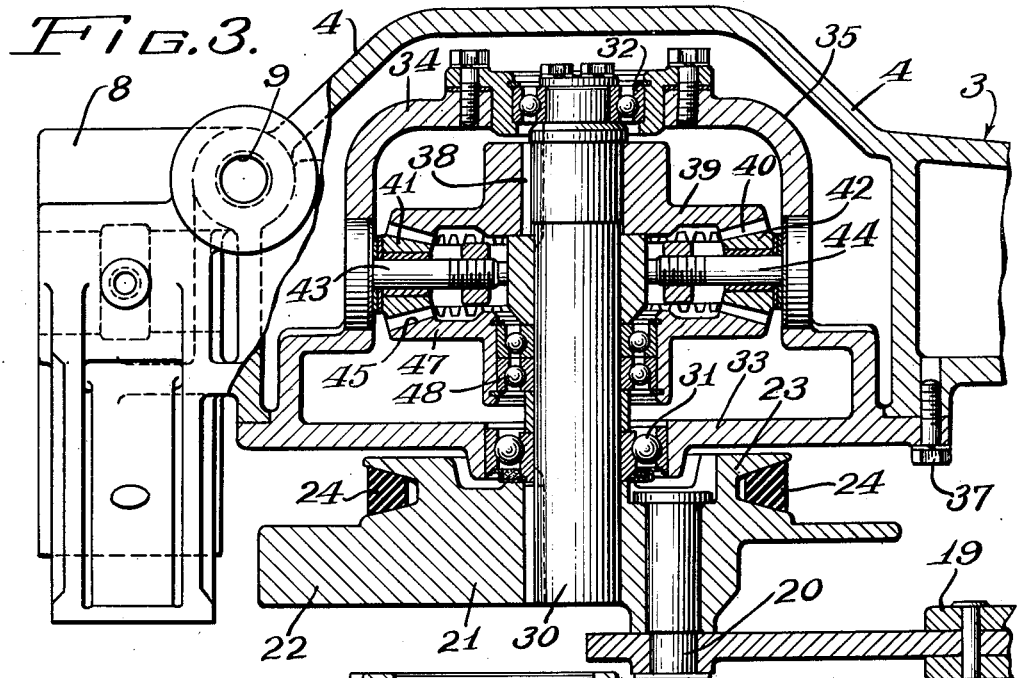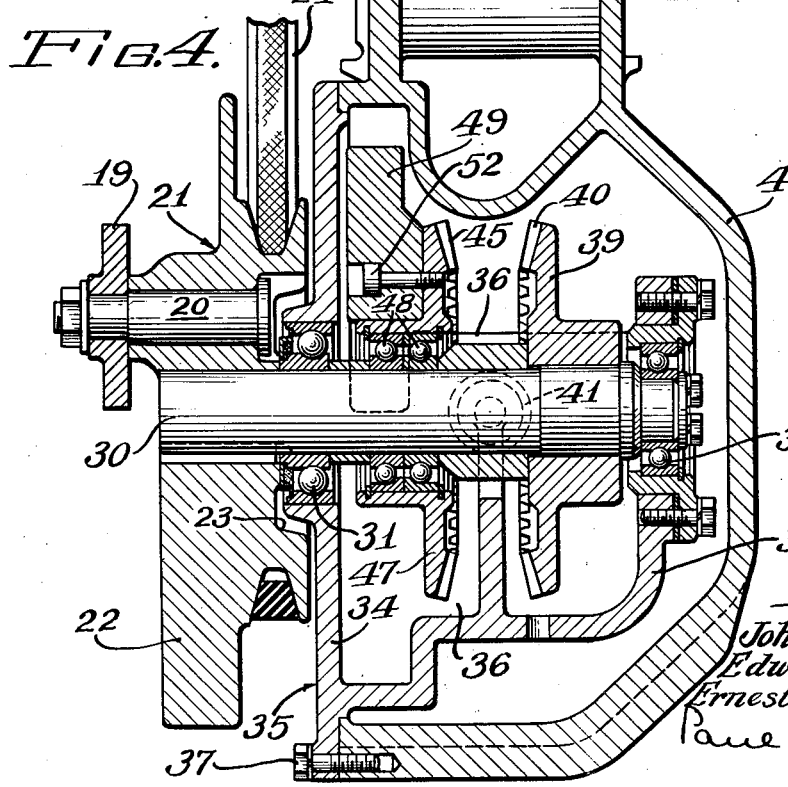

2,769,297
BALANCED MOWER

John R. Orelind, Wilmette, Edwin F. Huddle, Elmwood Park, and Ernest Scott Ulm, Jr., Chicago, Ill., assignors to International Harvester Company, a corporation of New Jersey Application August 13, 1953, Serial No. 373,948

1 Claim. (Cl. 56—306)

This invention relates to mowers and more particularly to a novel mower of the reciprocating cutter-bar type and is especially directed to a simplified counterbalancing assembly designed to effect a dynamic balance of the sickle mass.

A general object of the invention is to provide a compact, simple and efficient mower balancing assembly designed for ready adaptation to mowers of current make.

A more specific object is to provide in a mower a novel cutter balancing assembly comprising counter-rotating flywheels with weights so positioned as to provide an additive counterbalance to the cutter knife at each end of its stroke and a counterbalance to each other at other times.

These and other objects of the invention will become more apparent from the specification and the drawings, wherein:

Figure 1 is a fragmentary rear perspective view of a mower incorporating the invention;

Figure 2 is an enlarged fragmentary rear view of the novel counterbalancing arrangement shown in association with the mower support structure.

Figure 3 is a sectional view taken substantially along the line 3—3 of Figure 2;

Figure 4 is a further sectional view taken on the line 4—4 of Figure 2;

Figures 5-7 are diagrammatic views showing different positions of the counterbalancing mechanism in relation to the pitman; and Figure 8 is a fragmentary plan view showing the connection of the pitman with the sickle.

Describing the invention in detail, the mower generally designated 2 is of conventional construction and comprises a mower frame including a transverse frame member or support structure 3 in the form of a heavy iron casting with a rearwardly open housing portion 4 at one end from one side of which extends a tapered projection 5 through which and said housing extends a rock shaft 6 connected to mower lifting linkage 6' which at one end is connected to a lever 7 which is connected to the hydraulic lifting mechanism of the tractor and which is conventional as shown in U. S. Patent 2,269,982. The opposite end of the housing is provided with a bearing portion 8 incorporating a vertical pivot opening 9 through which is adapted to extend a pin (not shown) for a pivotal connection to the tractor carried drawbar framework, as shown in Patent 2,403,365. The bearing portion 8 also is provided with a fore and aft extending opening 10 for receiving a fore and aft extending end of a coupling bar 11, said bar extending laterally generally parallel to the frame member 3 at the rear thereof and at its far end with respect to its journal in the opening 10 is provided with a yoke casting 12 to which is pivotally connected as at 12' a mower or cutter assembly 13 comprising the usual mower bar 14 upon which is reciprocally mounted a knife blade or sickle 15 incorporating a series of longitudinally spaced teeth 16 cooperatively associated with cutter ledger plates within the knife guards 17 secured to the carrier bar 13 as is conventional practice.

The knife blade 15 is pivotally connected through a ball joint 18 as shown in Figure 8 to one end of a pitman 19, the other end of pitman 19 being rotatably journalled on a wrist pin or crank 20 which is connected to a rotary driving flywheel or member 21 eccentrically of its axis of rotation. The driving wheel 21 is provided with a counterbalancing weight 22 diametrically opposite the wrist pin 20. The pulley 21 is provided with an integral sheave 23 on its inner side within which is trained a driving belt 24, said belt being trained about a driving sheave 25 which is connected to a drive shaft 26 in driven relation thereby, said shaft 26 being rotatably mounted upon an upstanding bracket 27 which is adjustably mounted and connected to the member 3 to accommodate movement of the pulley 25 relative to the sheave 23 for tightening or loosening the belt 24. The shaft 26 may constitute the drive shaft as part of the power-takeoff shafting of an associated tractor from whence the mower is driven.

The rotary member 21 is keyed and fastened to one end of a countershaft 30 which is rotatably supported through bearings 31 and 32 within opposite end walls 33 and 34 of a casing generally designated 35 and nested within the housing portion 4 of the member 3, the casing 35 comprising a semicylindrical axially extending wall 36 extending between the end walls 33 and 34 and interconnecting the same. The wall 33 overlaps the open marginal edge of the housing 4 and is bolted thereto as at 37 to cover the open end of housing 4, and functionally may be considered part of the housing 4.

The shaft 30 is keyed as at 38 to a side gear 39 disposed within the casing 35 and the side gear has peripheral teeth 40 which mesh with pinion gears 41 and 42 diametrically disposed with respect to the shaft 30 and rotatably mounted from the side wall 36 of the casing 35 on pins 43, 44. The pinions 41, 42 mesh with teeth 45 of a companion side gear or rotary member or flywheel 47 which is rotatably mounted upon shaft 30 on bearings 48 and rotates in an opposite sense to the member 21. The gear 47 is provided with a balancing mass or counterweight 49 which is so designed as to counterbalance the mass of the counterweight 22 on the member 21 in the position shown in Figure 5 whereat the pitman and the sickle are at their midstroke.

From a consideration of Figure 3, it will be noted the pinions and side gears provide a 1:1 ratio so that the gear 47 is driven in an opposite sense and at the same speed as the member 21.

As seen in Figures 6 and 7, wherein the dead center positions of the pitman are shown as represented by the lines A—A whereat the longitudinal center line of the pitman is in simultaneous alignment with the centers 50, 51 of the crank 20 and shaft 30, and the center of gravity of the counterweight 22, the rotation of the counter-rotating member 47 is so phased that the balancing mass 49 which is fastened to gear 47 as by bolts 52, is disposed in axial alignment with the mass 22 thereby effecting an additive dynamic couple therewith directly opposing the mass of the pitman and the sickle, termed for purposes of simplicity the sickle mass. Figure 5 illustrates the counterbalance of masses 22, 49 in a generally vertical plane, indicated B—B.

It will be understood that the character of masses 49 and 21 is such as to balance each other and to additively counterbalance the sickle mass.

It will be understood that the above-described embodiment has been chosen merely by way of illustration and not limitation and that the scope of coverage is limited only by the claim appended hereto.

We claim:

In a harvester of the type comprising a support frame having means for mounting on a tractor, a mower assembly including a mower bar and a sickle reciprocal thereon, a coupling member pivotally carried on said support frame on a generally horizontal axis for vertical swinging movement and said coupling member pivotally connected to said mower bar on a generally horizontal axis whereby said mower assembly is pivotal upwardly and downwardly about said coupling member and swingable vertically with said coupling member, a driving shaft journalled on the support frame on a fore and aft extending axis, a sheave connected to the driving shaft, a belt trained about the sheave, a pitman connected at one end to the sickle, the improvement comprising: driving means for the sickle including a casing having means for attachment to said support frame, a shaft member journalled on the casing and extending outwardly of the casing, a sheave element connected to said shaft member outwardly of said casing, a counterweight and a wristpin connected to said sheave element at diametrically opposite sides of said shaft member, a first bevel gear within said casing connected to said shaft member, a second bevel gear within said casing journalled on said shaft member and having a counterweight at one side thereof, bevel gear means between and meshing with said bevel gears and journalled on the casing, said wristpin adapted to be journalled to the other end of said pitman, and said casing and frame having means for the mounting of said casing with the axis of said shaft member below and generally parallel to said driving shaft and said sheave and element vertically aligned with said belt trained thereabout whereby said bevel gears and sheave and element are adapted to operate in vertical planes and the gyroscopic effect of said driving means is entirely imposed upon said support frame.

References Cited in the file of this patent

UNITED STATES PATENTS

| | | |
|---|---|---|
| 2,345,383 | Curtis | Mar. 28, 1944 |
| 2,428,924 | Albertson | Oct. 14, 1947 |
| 2,651,906 | Bonner et al. | Sept. 15, 1953 |